US012608048B2

(12) United States Patent　　　　(10) Patent No.:　US 12,608,048 B2
Kishimoto et al.　　　　　　　　　(45) Date of Patent:　　Apr. 21, 2026

(54) DISPLAY DEVICE

(71) Applicant: Samsung Display Co., LTD., Yongin-si (KR)

(72) Inventors: Hirotsugu Kishimoto, Hwaseong-si (KR); Yongchan Jeon, Cheonan-si (KR); Chul Ho Jeong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 199 days.

(21) Appl. No.: 18/172,219

(22) Filed: Feb. 21, 2023

(65) Prior Publication Data

US 2023/0400887 A1　Dec. 14, 2023

(30) Foreign Application Priority Data

Jun. 8, 2022　(KR) ........................ 10-2022-0069734

(51) Int. Cl.
G06F 1/16　　　(2006.01)

(52) U.S. Cl.
CPC .......... G06F 1/1656 (2013.01); G06F 1/1616 (2013.01); G06F 1/1652 (2013.01)

(58) Field of Classification Search
CPC ................................................. H04M 1/0268
See application file for complete search history.

(56) References Cited

U.S. PATENT DOCUMENTS

| | | | |
|---|---|---|---|
| H1411 H | * | 2/1995 | Deshmukh .................... 420/407 |
| 2020/0225699 A1 | * | 7/2020 | Yu .......................... G06F 1/1652 |
| 2023/0049246 A1 | * | 2/2023 | Wang ................... H10K 77/111 |

FOREIGN PATENT DOCUMENTS

| | | |
|---|---|---|
| CN | 112991953 A | 6/2021 |
| KR | 10-1834793 B1 | 3/2018 |
| KR | 10-2019-0079751 A | 7/2019 |
| KR | 10-2021-0025747 A | 3/2021 |
| KR | 10-2021-0047616 A | 4/2021 |

OTHER PUBLICATIONS

"Current developments in wrought magnesium alloys," Pekguleryuz, Woodhead Publishing Limited, 2012 (Year: 2012).*

* cited by examiner

*Primary Examiner* — Ian A Rummel
(74) *Attorney, Agent, or Firm* — Womble Bond Dickinson (US) LLP

(57) ABSTRACT

A display device includes a display panel having a foldable area, a first support member on a lower surface of the display panel, having a stretchable portion overlapping the foldable area, and including a magnesium alloy including magnesium ("Mg") and an additive material, and a second support member on a lower surface of the first support member and including a first support plate and a second support plate spaced apart from each other. The content of the magnesium in the magnesium alloy is about 85 wt % to about 97 wt %.

7 Claims, 5 Drawing Sheets

300

301

θ

D1

D2

DISPLAY DEVICE

CROSS-REFERENCE TO RELATED APPLICATION

This application claims priority to and the benefit of Korean Patent Application No. 10-2022-0069734, filed on Jun. 8, 2022, in the Korean Intellectual Property Office, the entire content of which is hereby incorporated by reference.

BACKGROUND

1. Field

One or more embodiments of the present disclosure generally relate to a display device. More particularly, embodiments relate to a display device that provides visual information.

2. Description of the Related Art

With the development of information technology, the importance of display devices, which act as connection mediums between users and information, has been highlighted. For example, the use of display devices such as liquid crystal display devices ("LCDs"), organic light emitting display devices ("OLEDs"), plasma display device ("PDPs"), quantum dot display devices, and/or the like is increasing.

Recently, a flexible display device in which a lower substrate and an upper substrate of a display panel included in the display device may include a flexible material, and a portion of the display panel may be bent or folded, has been developed. For example, the lower substrate of the display panel may be formed of a polyimide substrate, and the upper substrate of the display panel may have a thin film encapsulation structure.

SUMMARY

Aspects of one or more embodiments are directed toward a display device having improved reliability.

Additional aspects will be set forth in part in the description which follows and, in part, will be apparent from the description, or may be learned by practice of the presented embodiments of the disclosure.

A display device according to one or more embodiments of the present disclosure may include a display panel having a foldable area, a first support member on a lower surface of the display panel, having a stretchable portion overlapping the foldable area, and including a magnesium alloy including magnesium ("Mg") and an additive material, and a second support member on a lower surface of the first support member and including a first support plate and a second support plate spaced apart from each other. A content (e.g., amount) of the magnesium in the magnesium alloy may be about 85 wt % to about 97 wt % (based on 100 wt % of the magnesium alloy).

In one or more embodiments, the additive material may include at least one of aluminum ("Al"), zinc ("Zn"), or lithium ("Li").

In one or more embodiments, the additive material may include the aluminum and a content (e.g., amount) of the aluminum in the magnesium alloy may be about 1 wt % to about 10 wt % (based on 100 wt % of the magnesium alloy).

In one or more embodiments, the additive material may include the zinc and a content (e.g., amount) of the zinc in the magnesium alloy may be about 0.1 wt % to about 2 wt % (based on 100 wt % of the magnesium alloy).

In one or more embodiments, a content (e.g., amount) of the magnesium in the magnesium alloy may be about 85 wt % to about 95 wt % (based on 100 wt % of the magnesium alloy), the additive material may include the lithium, and a content (e.g., amount) of the lithium in the magnesium alloy may be about 5 wt % to about 10 wt % (based on 100 wt % of the magnesium alloy).

In one or more embodiments, a Young's modulus of the first support member may be about 25 Gpa to about 55 Gpa.

In one or more embodiments, a thickness of the first support member may be about 0.1 mm to about 0.25 mm.

In one or more embodiments, the stretchable portion may include a plurality of openings each having a shape extending in a first direction and arranged in the first direction and in a second direction orthogonal to the first direction.

In one or more embodiments, a width of each of the plurality of openings may be about 0.2 mm to about 0.45 mm.

In one or more embodiments, a side surface of the first support member may have a tapered shape in a cross-sectional view.

In one or more embodiments, a taper angle of the first support member may be greater than or equal to about 85 degrees.

In one or more embodiments, the stretchable portion of the first support member may have a lattice shape in a plan view.

In one or more embodiments, the second support member may include stainless steel ("SUS").

A display device according to one or more embodiments of the present disclosure may include a display panel having a foldable area, a first support member on a lower surface of the display panel, having a stretchable portion overlapping the foldable area, and including a magnesium alloy including magnesium and an additive material, and a second support member on a lower surface of the first support member and including a first support plate and a second support plate spaced apart from (e.g., separated from) each other. A Young's modulus of the first support member may be about 25 Gpa to about 55 Gpa.

In one or more embodiments, the additive material may include at least one of aluminum, zinc, or lithium.

In one or more embodiments, a thickness of the first support member may be about 0.1 mm to about 0.25 mm.

In one or more embodiments, the stretchable portion may include a plurality of openings each having a shape extending in a first direction and arranged in the first direction and in a second direction orthogonal to the first direction.

In one or more embodiments, a width of each of the plurality of openings may be about 0.2 mm to about 0.45 mm.

In one or more embodiments, a side surface of the first support member may have a tapered shape in a cross-sectional view.

In one or more embodiments, a taper angle of the first support member may be greater than or equal to about 85 degrees.

In a display device according to one or more embodiments of the present disclosure, a support member on a lower surface of a display panel, having a stretchable portion overlapping a foldable area, and supporting the display panel may include a magnesium alloy including magnesium and an additive material. Accordingly, the support member may perform a heat dissipation function. In one or more embodiments, the weight of the display device may be reduced due to the support member. In one or more embodiments, as the workability of the support member is improved, the process cost of the display device may be reduced.

BRIEF DESCRIPTION OF THE DRAWINGS

The illustrated, non-limiting embodiments will be more clearly understood from the following detailed description in conjunction with the accompanying drawings.

DETAILED DESCRIPTION

Figure 1:
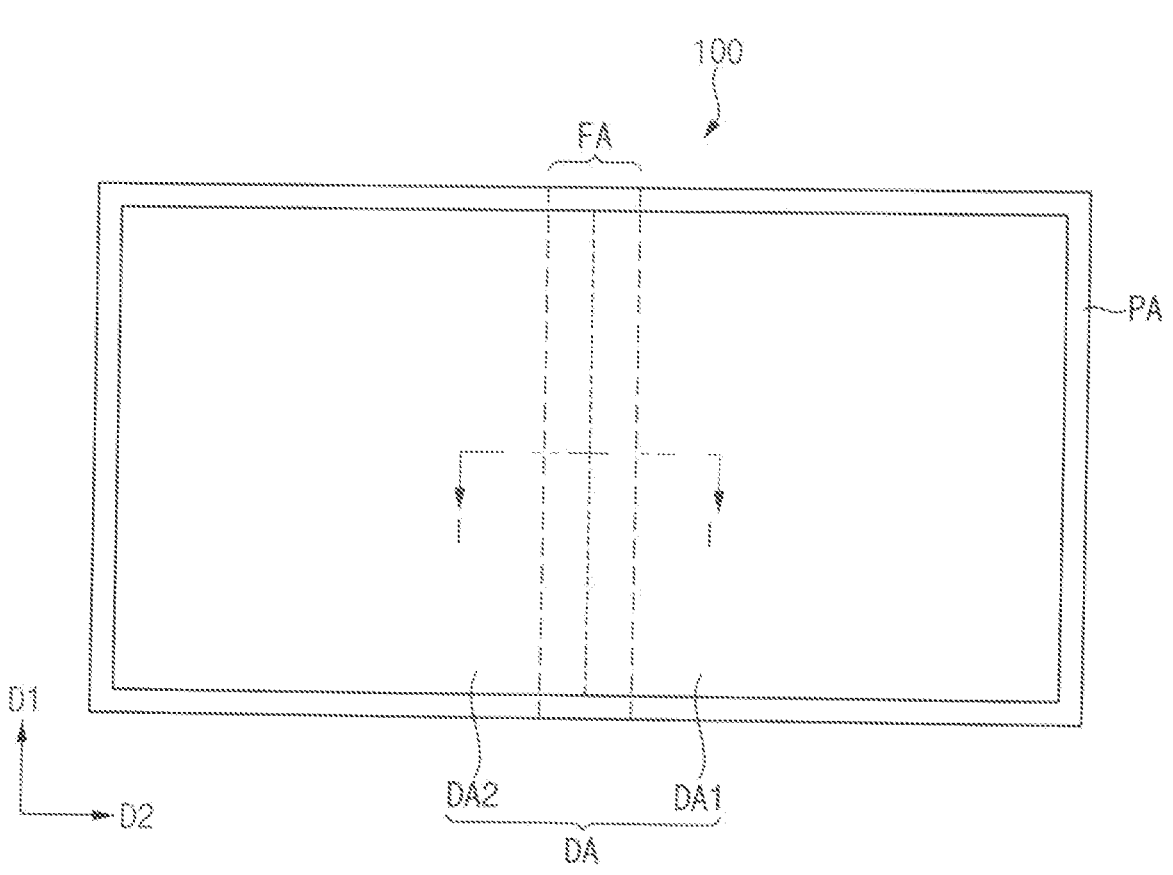
FIG. 1 is a plan view illustrating an unfolding state of a display device according to one or more embodiments of the present disclosure.

The present disclosure may be modified in many alternate forms, and thus specific embodiments will be exemplified in the drawing and described in more detail. It should be understood, however, that it is not intended to limit the present disclosure to the particular forms disclosed, but rather, is intended to cover all modifications, equivalents, and alternatives falling within the spirit and scope of the present disclosure.

Hereinafter, embodiments of the present disclosure will be explained in more detail with reference to the accompanying drawings. The same reference numerals refer to the same components throughout, and redundant descriptions of the same components may not be provided. In the drawings, the relative sizes of elements, layers, and regions may be exaggerated for clarity.

Figure 2:
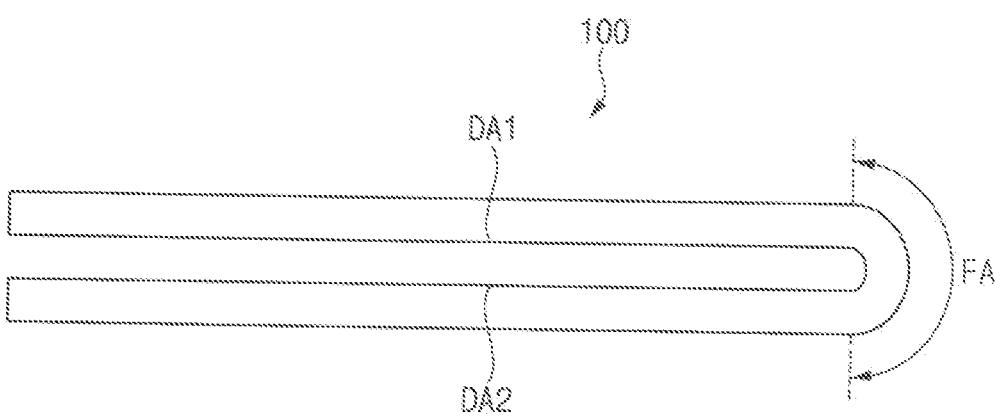
FIG. 2 is a side view illustrating a state in which the display device of FIG. 1 is folded, according to one or more embodiments of the present disclosure.

FIG. 1 is a plan view illustrating an unfolding state of a display device according to one or more embodiments of the present disclosure. FIG. 2 is a side view illustrating a state in which the display device of FIG. 1 is folded, according to one or more embodiments of the present disclosure.

Referring to FIGS. 1 and 2, the display device 100 may include a display area DA and a peripheral area PA. The display area DA may be defined as an area that generates an image, and the peripheral area PA may be defined as an area that does not generate an image. The peripheral area PA may be located adjacent to the display area DA. For example, the peripheral area PA may entirely surround (or be around) the display area DA.

The display device 100 may include a foldable area FA that can be bent by an external force so that the display device 100 can be folded. The foldable area FA may overlap the display area DA. For example, the foldable area FA may have a folding axis extending along a first direction D1.

The display area DA may be divided into a first display area DA1 and a second display area DA2 adjacent to each other in a second direction D2 intersecting the first direction

4

D1. For example, the second direction D2 may be orthogonal (i.e., perpendicular) to the first direction D1. The first display area DA1 and the second display area DA2 may be continuously connected to substantially form one display area DA. For example, when the display area DA is folded along the folding axis, as shown in FIG. 2, the first display area DA1 and the second display area DA2 face each other, and therefore the display device 100 may have an in-folding structure. In one or more embodiments, when the display area DA is folded along the folding axis, the display device 100 may have an out-folding structure in which the display area DA is disposed on an outside.

The display device 100 according to one or more embodiments is not limited to having one foldable area FA. For example, the display device 100 may be folded a plurality of times or may have a plurality of foldable areas to implement a rollable display device.

When the display device 100 according to one or more embodiments is folded, the display device 100 may be folded in a shape like a bell, e.g., a sideways "U". In one or more embodiments, the display device 100 may be folded in another shape such as the dumbbell or water drop.

Figure 3:
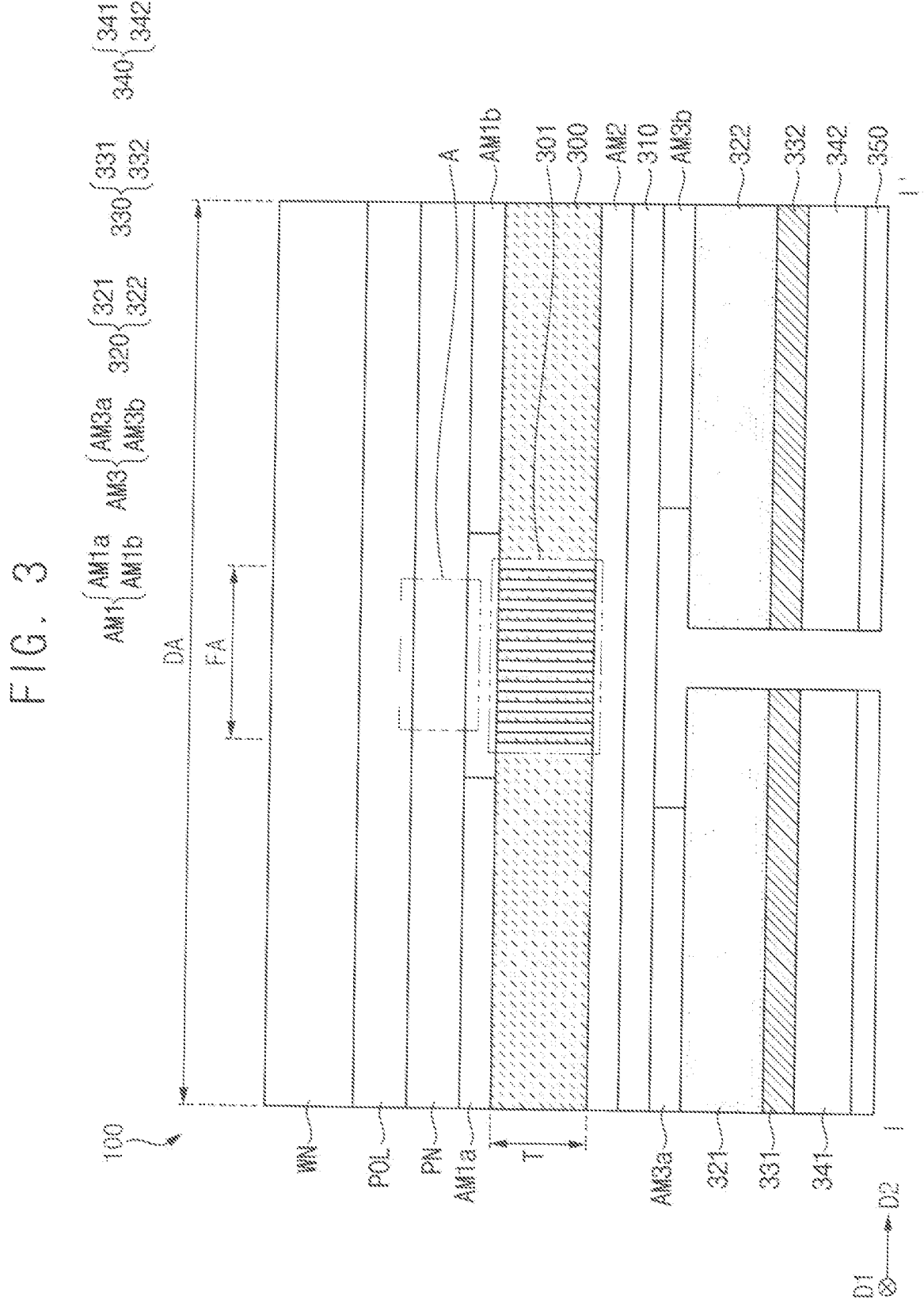
FIG. 3 is a cross-sectional view taken along line I-I' of FIG. 1, according to one or more embodiments of the present disclosure.

FIG. 3 is a cross-sectional view taken along line I-I' of FIG. 1, according to one or more embodiments. For example, FIG. 3 may represent an unfolded state of the display device 100.

Referring to FIG. 3, the display device 100 according to one or more embodiments may include a window member WN, a polarizing member POL, a display panel PN, a first adhesive member AM1, a first support member 300, a second adhesive member AM2, an elastic member 310, a third adhesive member AM3, a second support member 320, a heat dissipation member 330, a shock absorbing member 340, and an insulating member 350.

The polarizing member POL may be disposed on the display panel PN. As the display device 100 includes the foldable area FA, the display panel PN may also have the foldable area FA. The display panel PN may include a plurality of sub-pixels that generate light. The polarizing member POL may block or reduce external light incident to the display panel PN from the outside.

The window member WN may be disposed on the polarization member POL. The window member WN may have a transmission portion corresponding to the display area DA. For example, the window member WN may include a polymer material, a glass thin film, and/or the like to be bendable. These may be utilized alone or in combination with each other.

The first adhesive member AM1 may be disposed between the display panel PN and the first support member 300. The first adhesive member AM1 may include a first adhesive layer AM1a and a second adhesive layer AM1b that are spaced apart from (e.g., separated from) each other. For example, the first adhesive layer AM1a and the second adhesive layer AM1b may be spaced apart from (e.g., separated from) each other in the second direction D2. Each of the first adhesive layer AM1a and the second adhesive layer AM1b may not overlap the foldable area FA. In one or more embodiments, each of the first adhesive layer AM1a and the second adhesive layer AM1b may partially overlap the foldable area FA.

A upper surface of the first adhesive member AM1 may directly contact the display panel PN, and a lower surface of the first adhesive member AM1 may directly contact the first support member 300. Accordingly, the first adhesive member AM1 may attach the display panel PN and the first support member 300 to each other.

For example, the first adhesive member AM1 may include an optical clear adhesive ("OCA"), a pressure sensitive adhesive ("PSA"), a photocurable resin, a thermosetting resin, and/or the like. These may be utilized alone or in combination with each other.

The first support member 300 may be disposed on the lower surface of the display panel PN. In one or more embodiments, the first support member 300 may include a stretchable portion 301 overlapping the foldable area FA. The stretchable portion 301 may have elasticity corresponding to the folding and unfolding of the display device 100. In one or more embodiments, the stretchable portion 301 may have a lattice shape. However, although it is illustrated in FIG. 3 that the stretchable portion 301 is a single area, the present disclosure is not limited thereto. For example, the stretchable portion 301 may be formed in a plurality. A description of the stretchable portion 301 will be described in more detail later.

The first support member 300 may serve to support the display panel PN. In one or more embodiments, the first support member 300 may serve to help the display panel PN fold. For example, the first support member 300 may be entirely disposed on the lower surface of the display panel PN to support the display panel PN, and the stretchable portion 301 overlapping the foldable area FA may help the display panel PN to be folded.

The first support member 300 may include a metal having high thermal conductivity. In one or more embodiments, the first support member 300 may include a magnesium alloy. For example, the magnesium alloy may include magnesium ("Mg") and an additive material. The additive material may include aluminum ("Al"), zinc ("Zn"), lithium ("Li"), and/or the like. These may be utilized alone or in combination with each other.

In one or more embodiments, the first support member 300 may include a magnesium alloy including magnesium, aluminum, zinc, and lithium. In this case, the content (e.g., amount) of magnesium in the magnesium alloy may be about 85 wt % to about 97 wt %, and the content (e.g., amount) of the additive material may be about 22 wt % or less. In one or more embodiments, the content (e.g., amount) of aluminum in the magnesium alloy may be about 1 wt % to about 10 wt %, the content (e.g., amount) of zinc in the magnesium alloy may be about 0.1 wt % to about 2 wt %, and the content (e.g., amount) of lithium in the magnesium alloy may be about 1 wt % to about 10 wt %. In one or more embodiments, the content (e.g., amount) of lithium in the magnesium alloy may be about 5 wt % to about 10 wt %. In this case, the content (e.g., amount) of magnesium in the magnesium alloy may be about 85 wt % to about 95 wt %.

In one or more embodiments, the first support member 300 may include a magnesium alloy including magnesium, aluminum, and zinc. In this case, the content (e.g., amount) of magnesium in the magnesium alloy may be about 85 wt % to about 97 wt %, the content (e.g., amount) of aluminum in the magnesium alloy may be about 1 wt % to about 10 wt %, and the content (e.g., amount) of zinc in the magnesium alloy may be 0.1 wt % to about 2 wt %.

When the content (e.g., amount) of magnesium in the magnesium alloy is less than about 85 wt %, the thermal conductivity of the first support member 300 may be relatively low and the electrical resistance may be relatively high. In one or more embodiments, folding reliability of the display device 100 may be deteriorated. When the content (e.g., amount) of magnesium in the magnesium alloy is greater than about 97 wt %, folding reliability of the display device 100 may be deteriorated.

When the content (e.g., amount) of aluminum in the magnesium alloy is greater than about 10 wt %, the thermal conductivity of the first support member 300 may be relatively low and electrical resistance may be relatively high. When the content (e.g., amount) of zinc in the magnesium alloy is greater than about 2 wt %, the thermal conductivity of the first support member 300 may be relatively low and electrical resistance may be relatively high.

When the content (e.g., amount) of lithium in the magnesium alloy is greater than about 10 wt %, the thermal conductivity of the first support member 300 may be relatively low and the electrical resistance may be relatively high. In one or more embodiments, folding reliability of the display device 100 may be deteriorated.

In one or more embodiments, a thickness of the first support member 300 may be about 0.1 mm to about 0.25 mm.

In one or more embodiments, the Young's modulus of the first support member 300 may be about 25 Gpa to about 55 Gpa. In one or more embodiments, the Young's modulus of the first support member 300 may be about 30 Gpa to about 50 Gpa. For example, the Young's modulus of the first supporting member 300 of a remaining portion except for the stretchable portion 301 may be about 25 Gpa to about 55 Gpa. When the Young's modulus of the first support member 300 is less than about 25 Gpa or greater than about 55 Gpa, folding reliability of the display device 100 may be deteriorated.

The first support member 300 may radiate heat generated from the display panel PN to the outside and evenly distribute the heat. For example, the first support member 300 may perform a heat dissipation function. In one or more embodiments, the first support member 300 may be utilized as a ground pass (e.g., an electrical ground) of the display panel PN due to low electrical resistance. In one or more embodiments, the first support member 300 may reduce the weight of the display device 100 due to the low density of the magnesium alloy.

The elastic member 310 may be disposed on a lower surface of the first support member 300. For example, the elastic member 310 may be disposed between the first support member 300 and the second support member 320. The elastic member 310 may be disposed to overlap the foldable area FA. While the display device 100 repeatedly performs folding and unfolding, the elastic member 310 may prevent or reduce foreign substances from penetrating into the stretchable portion 301. In one or more embodiments, while the display device 100 repeatedly performs folding and unfolding, the elastic member 310 may be stretched and contracted so as not to expose the stretchable portion 301.

For example, the elastic member 310 may include an elastic polymer having a relatively large elastic force and/or a relatively large restoring force. For example, the elastic member 310 may include an elastic material such as silicone, urethane, or thermoplastic poly urethane ("TPU"). These may be utilized alone or in combination with each other.

The second adhesive member AM2 may be disposed between the first support member 300 and the elastic member 310. An upper surface of the second adhesive member AM2 may directly contact the first support member 300, and a lower surface of the second adhesive member AM2 may directly contact the elastic member 310. Accordingly, the second adhesive member AM2 may attach the first support member 300 and the elastic member 310 to each other.

The third adhesive member AM3 may be disposed between the elastic member 310 and the second support member 320. The third adhesive member AM3 may include a third adhesive layer AM3a and a fourth adhesive layer AM3b that are spaced apart from (e.g., separated from) each other. For example, the third adhesive layer AM3a and the fourth adhesive layer AM3b may be spaced apart from (e.g., separated from) each other in the second direction D2. Each of the third adhesive layer AM3a and the fourth adhesive layer AM3b may not overlap the foldable area FA. The third adhesive layer AM3a may attach the elastic member 310 and the first support plate 321 of the second support member 320, and the fourth adhesive layer AM3b may attach the elastic member 310 and the second support member 320. The second support plate 322 of the member 320 may be attached.

For example, each of the second adhesive member AM2 and the third adhesive member AM3 may include an optically clear adhesive, a pressure-sensitive adhesive, a photo-curable resin, a thermosetting resin, and/or the like. These may be utilized alone or in combination with each other.

The second support member 320 may be disposed on the lower surface of the elastic member 310. The second support member 320 may include a first support plate 321 and a second support plate 322 spaced apart from (e.g., separated from) each other. For example, the first support plate 321 and the second support plate 322 may be spaced apart from (e.g., separated from) each other in the second direction D2. Each of the first support plate 321 and the second support plate 322 may partially overlap the foldable area FA.

For example, when the display device 100 is folded, a distance between the first support plate 321 and the second support plate 322 of the second support member 320 may increase. The second support member 320 may prevent or substantially prevent the stretchable portion 301 of the first support member 300 from being pressed.

The second support member 320 may include metal, glass, or plastic. For example, the second support member 320 may include stainless steel ("SUS"). In one or more embodiments, the second support member 320 may include glass fiber reinforced plastic ("GFRP"), carbon fiber reinforced plastic ("CFRP"), and/or the like. These may be utilized alone or in combination with each other. However, the configuration of the present disclosure is not limited thereto, and the second support member 320 may include other materials.

The heat dissipation member 330 may be disposed on a lower surface of the second support member 320. The heat dissipation member 330 may include a first heat dissipation layer 331 and a second heat dissipation layer 332 spaced apart from (e.g., separated from) each other. For example, the first heat dissipation layer 331 and the second heat dissipation layer 332 may be spaced apart from (e.g., separated from) each other in the second direction D2. The upper surface of the first heat dissipation layer 331 may directly contact the first support plate 321, and the upper surface of the second heat dissipation layer 332 may directly contact the second support plate 322. Each of the first heat dissipation layer 331 and the second heat dissipation layer 332 may partially overlap the foldable area FA. The heat dissipation member 330 may include a material having high thermal conductivity. For example, the heat dissipation member 330 may include aluminum ("Al"), copper ("Cu"), and/or the like. These may be utilized alone or in combination with each other. In one or more embodiments, the heat dissipation member 330 may not be provided.

The shock absorbing member 340 may be disposed on the lower surface of the heat dissipation member 330. The shock absorbing member 340 may include a first cushion layer 341 and a second cushion layer 342 that are spaced apart from (e.g., separated from) each other. For example, the first cushion layer 341 and the second cushion layer 342 may be spaced apart from (e.g., separated from) each other in the second direction D2. Each of the first cushion layer 341 and the second cushion layer 342 may partially overlap the foldable area FA. An upper surface of the first cushion layer 341 may directly contact the first heat dissipation layer 331, and an upper surface of the second cushion layer 342 may directly contact the second heat dissipation layer 332.

The shock absorbing member 340 may protect the display panel PN from external impact. In one or more embodiments, the shock absorbing member 340 may include a material having flexibility so that the display device 100 is easily folded. For example, the shock absorbing member 340 may include a foam-type or kind material such as polyurethane foam, polystyrene foam, and/or the like. These may be utilized alone or in combination with each other.

The insulating member 350 may be disposed on a lower surface of the shock absorbing member 340. For example, the insulating member 350 may be formed in the form of a film or a tape. The insulating member 350 may prevent or substantially prevent a rattle from being generated in the display device 100.

Figure 4:
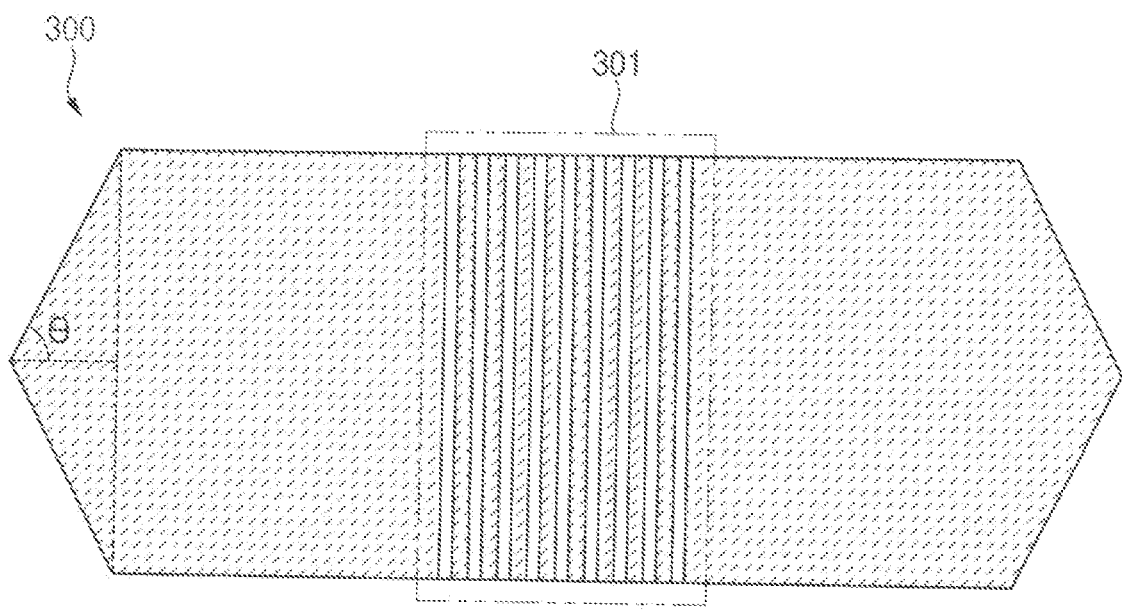
FIG. 4 is an enlarged cross-sectional view of a stretchable portion of the first supporting member of FIG. 3, according to one or more embodiments of the present disclosure.
Figure 4:
Figure 5:
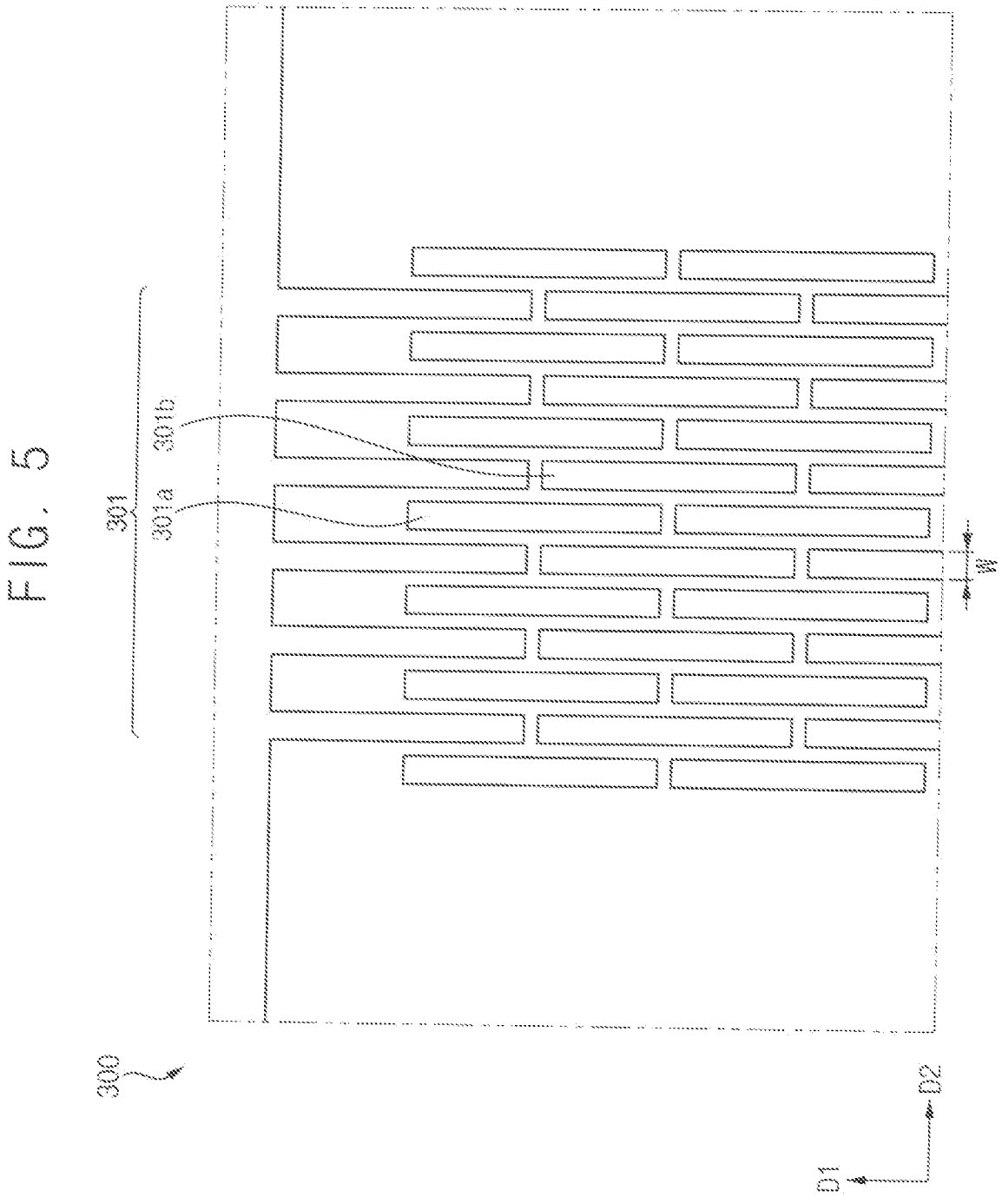
FIG. 5 is a plan view illustrating a stretchable portion of the first supporting member of FIG. 3, according to one or more embodiments of the present disclosure.

FIG. 4 is an enlarged cross-sectional view of a stretchable portion of the first supporting member of FIG. 3, according to one or more embodiments of the present disclosure. FIG. 5 is a plan view illustrating a stretchable portion of the first supporting member of FIG. 3, according to one or more embodiments of the present disclosure.

Referring to FIG. 4, in one or more embodiments, the side surface of the first support member 300 may have a tapered shape when viewed in cross-sectional view. For example, the first support member 300 may have a hexagonal shape when viewed in cross-sectional view. However, the configuration of the present disclosure is not limited thereto, and the first support member 300 may have one or more suitable polygonal shapes when viewed in cross-sectional view. When the side surface of the first support member 300 has a tapered shape when viewed in cross-sectional view, the taper angle θ of the first support member 300 may be about 85 degrees or more.

Referring to FIG. 5, the first support member 300 may include a stretchable portion 301 having a lattice shape. The stretchable portion 301 may include a plurality of openings 301a and 301b. For example, the plurality of openings 301a and 301b may be formed through an etching process or a punching process.

In one or more embodiments, the width W of each of the plurality of openings 301a and 301b may be about 0.2 mm to about 0.45 mm. In one or more embodiments, the width W of each of the plurality of openings 301a and 301b may be about 0.2 mm to about 0.4 mm.

In one or more embodiments, each of the plurality of openings 301a and 301b may have a shape extending in the first direction D1 and may be arranged in the first direction D1 and the second direction D2 orthogonal to the first direction D1. In one or more embodiments, the second openings 301b adjacent to the first openings 301a in the second direction D2 may be shifted from the first openings 311a along the second direction D2 so that the plurality of openings 301a and 301b form an overall staggered arrangement.

When a first support member disposed on a lower surface of the display panel having a foldable area and including a stretchable portion overlapping the foldable area includes stainless steel, a weight of a display device including the first support member increases, and a separate heat dissipation layer is essential due to the low thermal conductivity of the first supporting member. When the first support member includes carbon fiber reinforced plastic, a separate heat dissipation layer is essential due to the low thermal conductivity of the first support member.

In one or more embodiments, when the first support member includes stainless steel or carbon fiber reinforced plastic, punching the first support member may not be possible and/or practicable. Accordingly, the process cost of the display device may increase.

In the display device 100 according to one or more embodiments of the present disclosure, the first support portion 300 disposed on a lower surface of the display panel PN, having the stretchable portion 301 overlapping the foldable area FA, and supporting the display panel PN may include a magnesium alloy containing magnesium and an additive material. Accordingly, the first support member 300 may perform a heat dissipation function. In one or more embodiments, the weight of the display device 100 may be reduced due to the first support member 300. In one or more embodiments, as the workability of the first support member 300 is improved, the process cost of the display device 100 may be reduced.

Figure 6:
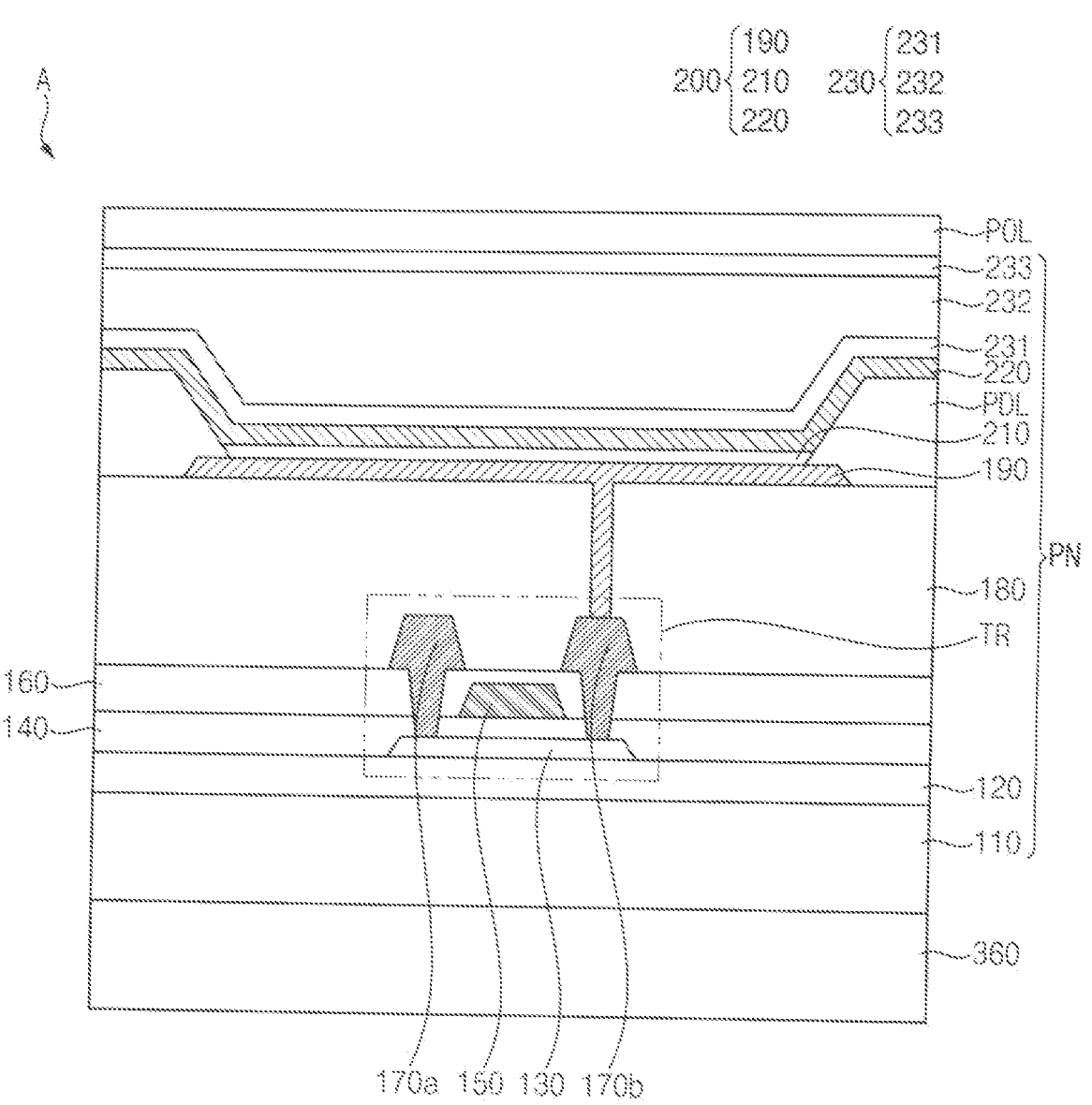
FIG. 6 is an enlarged cross-sectional view of area "A" of FIG. 3, according to one or more embodiments of the present disclosure.

FIG. 6 is an enlarged cross-sectional view of area "A" of FIG. 3, according to one or more embodiments. For example, FIG. 6 is a cross-sectional view illustrating a portion of the display panel PN of FIG. 3.

Referring to FIG. 6, the display panel PN may include a substrate 110, a buffer layer 120, a gate insulating layer 140, a transistor TR, an interlayer insulating layer 160, a planarization layer 180, a pixel defining layer PDL, a light emitting element 200 and the encapsulation layer 230.

Here, the transistor TR may include an active layer 130, a gate electrode 150, a source electrode 170a and a drain electrode 170b, the light emitting element 200 may include a lower electrode 190, a light emitting layer 210 and an upper electrode 220, and the encapsulation layer 230 may include a first thin film encapsulation layer 231, a second thin film encapsulation layer 232, and a third thin film encapsulation layer 233.

A panel protective layer 360 may be disposed on the lower surface of the substrate 110. The panel protective layer 360 may protect the lower portion of the display panel PN. The panel protective layer 360 may include a flexible plastic material. For example, the panel protective layer 360 may include polyethylene terephthalate and/or the like. However, the material included in the panel protective layer 360 is not limited thereto, and the panel protective layer 360 may include other flexible plastic materials.

The substrate 110 may include a transparent material or an opaque material. The substrate 110 may include a flexible transparent resin substrate. An example of the transparent resin substrate that can be utilized as the substrate 110 may be a polyimide substrate. In one or more embodiments, the substrate 110 may include a quartz substrate, a synthetic quartz substrate, a calcium fluoride substrate, a soda lime glass substrate, an alkali-free glass substrate, and/or the like. These may be utilized alone or in combination with each other.

The buffer layer 120 may be disposed on the substrate 110. The buffer layer 120 may prevent or reduce diffusion of metal atoms or impurities from the substrate 110 to the transistor TR. For example, the buffer layer 120 may include an inorganic material such as silicon oxide, silicon nitride, and/or the like. These may be utilized alone or in combination with each other.

The active layer 130 may be disposed on the buffer layer 120. The active layer 130 may include a metal oxide semiconductor, an inorganic semiconductor (e.g., amorphous silicon, polysilicon), or an organic semiconductor, etc. The active layer 130 has a source region, a drain region, and a channel region positioned between the source region and the drain region.

The gate insulating layer 140 may be disposed on the buffer layer 120. The gate insulating layer 140 may sufficiently cover the active layer 130 on the substrate 110, and may have a substantially flat upper surface without creating a step around the active layer 130. In one or more embodiments, the gate insulating layer 140 may cover the active layer 130 on the substrate 110, and may be disposed along a profile of the active layer 130 with a substantially uniform thickness. For example, the gate insulating layer 140 may include silicon oxide ($SiO_x$), silicon nitride ($SiN_x$), silicon carbide ($SiC_x$), silicon oxynitride ($SiO_xN_y$), silicon oxycarbide ($SiO_xC_y$), and/or the like. These may be utilized alone or in combination with each other.

The gate electrode 150 may be disposed on the gate insulating layer 140. The gate electrode 150 may overlap the channel region of the active layer 130. For example, the gate electrode 150 may include a metal, an alloy, a metal nitride, a conductive metal oxide, a transparent conductive material, and/or the like. These may be utilized alone or in combination with each other.

The interlayer insulating layer 160 may be disposed on the gate insulating layer 140. The interlayer insulating layer 160 may sufficiently cover the gate electrode 150 on the substrate 110, and may have a substantially flat upper surface without creating a step around the gate electrode 150. In one or more embodiments, the interlayer insulating layer 160 may cover the gate electrode 150 on the substrate 110, and may be disposed along a profile of the gate electrode 150 with a substantially uniform thickness. For example, the insulating interlayer 160 may include silicon oxide, silicon nitride, silicon carbide, silicon oxynitride, silicon oxycarbide, and/or the like. These may be utilized alone or in combination with each other.

The source electrode 170a and the drain electrode 170b may be disposed on the interlayer insulating layer 160. The source electrode 170a may be connected to the source region of the active layer 130 through a contact hole formed by removing a first portion of the gate insulating layer 140 and the interlayer insulating layer 160. The drain electrode 170b may be connected to the drain region of the active layer 130 through a contact hole formed by removing a second portion of the gate insulating layer 140 and the interlayer insulating layer 160. For example, each of the source electrode 170a and the drain electrode 170b may include a metal, an alloy, a metal nitride, a conductive metal oxide, a transparent conductive material, and/or the like. These may be utilized alone or in combination with each other.

Accordingly, the transistor TR including the active layer 130, the gate electrode 150, the source electrode 170a, and the drain electrode 170b may be disposed in the display area DA on the substrate 110.

The planarization layer 180 may be disposed on the interlayer insulating layer 160. The planarization layer 180 may sufficiently cover the source electrode 170a and the drain electrode 170b. The planarization layer 180 may include an organic material or an inorganic material. In one or more embodiments, the planarization layer 180 may include an organic material. For example, the planarization layer 180 may include an organic material such as a polyimide-based resin, a photoresist, a polyacryl-based resin, a polyimide-based resin, a siloxane-based resin, and/or the like. These may be utilized alone or in combination with each other.

The lower electrode 190 may be disposed on the planarization layer 180. The lower electrode 190 may be connected to the drain electrode 170b through a contact hole formed by removing a portion of the planarization layer 180. For example, the lower electrode 190 may include a metal, an alloy, a metal nitride, a conductive metal oxide, a transparent conductive material, and/or the like. These may be utilized alone or in combination with each other.

The pixel defining layer PDL may be disposed on the planarization layer 180. An opening exposing a portion of the lower electrode 190 may be defined in the pixel defining layer PDL. The pixel defining layer PDL may include an organic material or an inorganic material. For example, the pixel defining layer PDL may include an organic material such as a polyimide-based resin, a photoresist, a polyacrylic resin, a polyimide-based resin, a siloxane-based resin, and/or the like. These may be utilized alone or in combination with each other.

The light emitting layer 210 may be disposed on the lower electrode 190. The light emitting layer 210 may be disposed on the lower electrode 190 exposed by the opening. The light emitting layer 210 may be formed utilizing at least one of light emitting materials capable of emitting red light, green light, and blue light. In one or more embodiments, the light emitting layer 210 may be to emit white light as a whole by stacking a plurality of light emitting materials capable of generating different color lights such as red light, green light, and blue light.

The upper electrode 220 may be disposed on the pixel defining layer PDL and the light emitting layer 210. The upper electrode 220 may be entirely disposed in (e.g., disposed across the entirety of) the display area DA illustrated in FIG. 1. For example, the upper electrode 220 may include a metal, an alloy, a metal nitride, a conductive metal oxide, a transparent conductive material, and/or the like. These may be utilized alone or in combination with each other.

Accordingly, the light emitting element 200 including the lower electrode 190, the light emitting layer 210, and the upper electrode 220 may be disposed in the display area DA on the substrate 110.

The first thin film encapsulation layer 231 may be disposed on the upper electrode 220. The first thin film encapsulation layer 231 may prevent or substantially prevent the light emitting layer 210 from being deteriorated due to penetration of moisture, oxygen, and/or the like. In one or more embodiments, the first thin film encapsulation layer 231 may protect the display panel PN from external impact. For example, the first thin film encapsulation layer 231 may include flexible inorganic materials.

The second thin film encapsulation layer 232 may be disposed on the first thin film encapsulation layer 231. The second thin film encapsulation layer 232 may improve the flatness of the display panel PN and protect the display panel PN. For example, the second thin film encapsulation layer 232 may include flexible organic materials.

The third thin film encapsulation layer 233 may be disposed on the second thin film encapsulation layer 232. The third thin film encapsulation layer 233 and the first thin film encapsulation layer 231 may prevent or substantially prevent the light emitting layer 210 from being deteriorated due to penetration of moisture, oxygen, and/or the like. In one or more embodiments, the third thin film encapsulation layer 233 may protect the display panel PN together with the first thin film encapsulation layer 231 and the second thin film encapsulation layer 232 from external impact. For example, the third thin film encapsulation layer 233 may include flexible inorganic materials.

Although the display device 100 of the present disclosure is described with respect to certain embodiments of an organic light emitting display device, the configuration of the present disclosure is not limited thereto. For example, the display device 100 may include a liquid crystal display device ("LCD"), a field emission display device ("FED"), a plasma display device ("PDP"), an electrophoretic display device ("EPD") or a quantum dot display device.

Hereinafter, additional embodiments and/or aspects of embodiments of the present disclosure will be described with reference to Examples and Comparative Examples.

Examples 1 to 8, Comparative Examples 1 and 2

For each of Examples 1 to 8, a first supporting member having a lattice portion was manufactured by utilizing a magnesium alloy containing about 85 wt % to about 97 wt % magnesium, about 0.1 wt % to about 10 wt % aluminum, about 0.1 wt % to about 2 wt % zinc, and about 5 wt % to about 10 wt % lithium. For Comparative Example 1, a first supporting member having a lattice portion was manufactured utilizing stainless steel. For Comparative Example 2, a first supporting member having a lattice portion was manufactured utilizing carbon fiber reinforced plastic. Thicknesses of the first support members and widths of each of openings of the lattice portions of the first support members according to the Examples and Comparative Examples are shown in Table 1.

TABLE 1

|  | Thickness (mm) | Width (mm) |
|---|---|---|
| Example 1 | 0.15 | 0.2 |
| Example 2 | 0.15 | 0.2 |
| Example 3 | 0.15 | 0.2 |
| Example 4 | 0.15 | 0.2 |
| Example 5 | 0.15 | 0.2 |
| Example 6 | 0.15 | 0.4 |
| Example 7 | 0.15 | 0.42 |
| Example 8 | 0.15 | 0.15 |
| Comparative Example 1 | 0.15 | 0.2 |
| Comparative Example 2 | 0.15 | 0.2 |

In Table 2, the impact resistance characteristics and folding reliabilities of the display devices according to the Examples and Comparative Examples were evaluated, and whether punching processing was possible on the first support members of the display devices was checked. In addition, the Young's moduli of the first supporting members of the display devices was measured. For example, in order to evaluate the folding reliabilities of the display devices according to the Examples and Comparative Examples, the display devices of Examples 1 to 4, Example 6 and Example 8 repeated folding and unfolding about 200,000 times, the display device of Example 5 repeated folding and unfolding about 50,000 times, the display device of Example 7 repeated folding and unfolding about 70,000 times, the display devices of Comparative Examples 1 and 2 repeated folding and unfolding less than 10,000 times. In this case, the display devices according to the Examples and Comparative Examples were folded in a sideways "U" shape. In addition, a punching process was performed on the first support members of the display devices according to the Examples and Comparative Examples.

In Table 2, a "pen drop" is utilized to evaluate impact resistances, and when the same "pen" is dropped on the display device, the height at which a defect of the display device occurs is measured. In addition, "NG" indicates a case in which detachment or deformation of the first support member occurs in the folding reliability evaluation. "OK" indicates a case in which detachment and deformation of the first support member do not occur in the folding reliability evaluation, and the first support member is maintained.

TABLE 2

|  | Young's modulus (Gpa) | Pen drop (cm) | Folding reliability | Punching processing |
|---|---|---|---|---|
| Example 1 | 30 | 8 | OK | Possible |
| Example 2 | 40 | 8 | OK | Possible |
| Example 3 | 50 | 8 | OK | Possible |
| Example 4 | 28 | 8 | OK | Possible |
| Example 5 | 51 | 8 | OK | Possible |
| Example 6 | 30 | 8 | OK | Possible |
| Example 7 | 30 | 8 | OK | Possible |
| Example 8 | 30 | 8 | OK | Impossible |
| Comparative Example 1 | 206 | 5 | NG | Impossible |
| Comparative Example 2 | 60 | 5 | NG | Impossible |

As illustrated in Table 2, the Young's moduli of the first support members of Examples 1 to 8 satisfy the range of about 25 Gpa to about 55 Gpa. On the other hand, the Young's moduli of the first support members of Comparative Examples 1 and 2 are out of the range of about 25 Gpa to about 55 Gpa.

The first support members of Examples 1 to 8 exhibit improved pen drop height compared to the first support members of Comparative Examples 1 and 2, as shown in Table 2. In addition, the first support members of Examples 1 to 8 exhibit better folding reliability than the first support members of Comparative Examples 1 and 2. In addition, openings can be formed in the first support members of Examples 1 to 7 by a punching process. On the other hand, forming an opening in the first support members of Example 8, Comparative Example 1, and Comparative Example 2 through a punching process was not possible.

Examples 9 to 12, Comparative Examples 3 to 7

According to the Examples 9 to 12 and Comparative Examples 3 to 7, as illustrated in Table 3, first support members having a lattice portion was manufactured utilizing a magnesium alloy including magnesium, aluminum, zinc, and/or lithium.

TABLE 3

|  | Al (%) | Zn (%) | Li (%) | Mg (%) |
|---|---|---|---|---|
| Example 9 | 3 | 1 | 0 | 96 |
| Example 10 | 6 | 0.5 | 0 | 93.5 |
| Example 11 | 9 | 0.4 | 0 | 90.6 |
| Example 12 | 0 | 1.2 | 8.5 | 90.3 |
| Comparative Example 3 | 12 | 1 | 0 | 87 |
| Comparative Example 4 | 9 | 3.5 | 0 | 87.5 |
| Comparative Example 5 | 0 | 1.2 | 11 | 87.8 |

TABLE 3-continued

|  | Al (%) | Zn (%) | Li (%) | Mg (%) |
|---|---|---|---|---|
| Comparative Example 6 | 7 | 1 | 8 | 84 |
| Comparative Example 7 | 0 | 0 | 0 | 100 |

In Table 4, folding reliabilities of the display devices according to the Examples and Comparative Examples were evaluated, and the densities, Young's moduli, thermal conductivities, and electrical resistances of the first supporting members of the display device were measured. For example, in order to evaluate the folding reliabilities of the display devices according to the Examples and Comparative Examples, folding and unfolding of the display devices were repeated about 200,000 times. At this time, the display devices were folded in a sideways "U" shape.

TABLE 4

|  | Density (g/cm3) | Young's modulus (Gpa) | Folding reli-ability | Thermal conductivity (W/Mk) | Electrical resistance (Ω/cm) |
|---|---|---|---|---|---|
| Example 9 | 1.78 | 45 | OK | 75 | $9 \times 10^{-6}$ |
| Example 10 | 1.79 | 45 | OK | 79 | $8 \times 10^{-6}$ |
| Example 11 | 1.81 | 45 | OK | 75 | $9 \times 10^{-6}$ |
| Example 12 | 1.50 | 45 | OK | 56 | $1.2 \times 10^{-5}$ |
| Comparative Example 3 | 1.9 | 47 | OK | 20 | $4.3 \times 10^{-5}$ |
| Comparative Example 4 | 1.86 | 45 | OK | 28 | $3.8 \times 10^{-5}$ |
| Comparative Example 5 | 1.48 | 45 | NG | 22 | $4 \times 10^{-5}$ |
| Comparative Example 6 | 1.70 | 46 | NG | 18 | $5.5 \times 10^{-5}$ |
| Comparative Example 7 | 1.74 | 45 | NG | 155 | $5 \times 10^{-6}$ |

As illustrated in Table 4, the first support members of Examples 9 to 12, and Comparative Examples 3 to 7 have relatively low densities. In addition, the Young's moduli of the first supporting members of Examples 9 to 12 and Comparative Examples 3 to 7 satisfy the range of about 25 Gpa to about 55 Gpa.

The first support members of Examples 9 to 12, Comparative Example 3, and Comparative Example 4 represent better folding reliability than the first support members of Comparative Examples 5 to 7.

The thermal conductivities of the first supporting members of Examples 9 to 12 are relatively higher than the thermal conductivities of the first supporting members of Comparative Examples 3 to 6. In addition, the electrical resistances of the first support members of Examples 9 to 12 are relatively low compared to the electrical resistances of the first support members of Comparative Examples 3 to 6.

From these results, it can be confirmed that the first support members of the display devices according to one or more embodiments has excellent or suitable impact resistance, workability, and folding reliability. In one or more embodiments, the first support member performs a heat dissipation function due to relatively high thermal conductivity, may be utilized as a ground path of the display panel due to relatively low electrical resistance, and may reduce the weight of the display device due to relatively low density of the first support member.

The present disclosure can be applied to one or more suitable display devices. For example, the present disclosure is applicable to one or more suitable display devices such as display devices for vehicles, ships and aircraft, portable communication devices, display devices for exhibition or information transmission, medical display devices, and/or the like.

The light emitting device, electronic apparatus or any other relevant devices or components according to embodiments of the present disclosure described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on" or "connected to" another element or layer, it can be directly on or connected to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Expressions such as "at least one of," "a plurality of," "one of," and other prepositional phrases, when preceding a list of elements, should be understood as including the disjunctive if written as a conjunctive list and vice versa. For example, the expressions "at least one of a, b, or c," "at least one of a, b, and/or c," "one selected from the group consisting of a, b, and c," "at least one selected from a, b, and c," "at least one from among a, b, and c," "one from among a, b, and c", "at least one of a to c" indicates only a, only b, only c, both a and b, both a and c, both b and c, all of a, b, and c, or variations thereof.

The use of "may" when describing embodiments of the present disclosure refers to "one or more embodiments of the present disclosure."

As used herein, the singular forms "a", "an" and "the" are intended to include the plural forms as well, unless the context clearly indicates otherwise.

As used herein, the term "substantially," "about," and similar terms are used as terms of approximation and not as terms of degree, and are intended to account for the inherent deviations in measured or calculated values that would be recognized by those of ordinary skill in the art. "About", "substantially," or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than such as, for example, 2.4 to 7.6. Any maximum numerical limitation recited herein is intended to include all lower numerical limitations subsumed therein and any minimum numerical limitation recited in this disclosure is intended to include all higher numerical limitations subsumed therein. Accordingly, Applicant reserves the right to amend this disclosure, including the claims, to expressly recite any sub-range subsumed within the ranges expressly recited herein.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although the embodiments of the present disclosure have been described, it is understood that the present disclosure should not be limited to these embodiments, but one or more suitable changes and modifications can be made by one ordinary skilled in the art within the spirit and scope of the present disclosure as defined by the following claims and equivalents thereof.

What is claimed is:

1. A display device comprising:

a display panel having a foldable area;

a first support member on a lower surface of the display panel, having a stretchable portion overlapping the foldable area, and comprising a magnesium alloy comprising magnesium and an additive material; and a second support member on a lower surface of the first support member and comprising a first support plate and a second support plate spaced apart from each other, wherein a content of the magnesium in the magnesium alloy is about 90 wt % to about 95 wt %, wherein the additive material comprises aluminum, zinc, and lithium, wherein a content of the aluminum in the magnesium alloy is about 0.1 wt % to about 10 wt %, a content of the zinc in the magnesium alloy is about 0.1 wt % to about 2 wt %, and a content of the lithium in the magnesium alloy is about 1 wt % to about 10 wt %, wherein a thickness of the first support member is about 0.1 mm to about 0.25 mm, and wherein the stretchable portion comprises a plurality of openings and a width of each of the plurality of openings is about 0.2 mm to about 0.45 mm.

2. The display device of claim 1, wherein a Young's modulus of the first support member is about 25 Gpa to about 55 Gpa.

3. The display device of claim 1, wherein the plurality of openings each has a shape extending in a first direction and arranged in the first direction and in a second direction orthogonal to the first direction.

4. The display device of claim 1, wherein a side surface of the first support member has a tapered shape in a cross-sectional view.

5. The display device of claim 4, wherein a taper angle of the first support member is greater than or equal to about 85 degrees.

6. The display device of claim 1, wherein the stretchable portion of the first support member has a lattice shape in a plan view.

7. The display device of claim 1, wherein the second support member comprises stainless steel ("SUS").

* * * * *